July 26, 1966

L. W. ROSS 3,262,432

ROTARY ENGINE

Filed April 6, 1964

INVENTOR.
LEROY W. ROSS
BY E. H. Schmidt

ATTORNEY.

July 26, 1966  L. W. ROSS  3,262,432
ROTARY ENGINE
Filed April 6, 1964  2 Sheets-Sheet 2
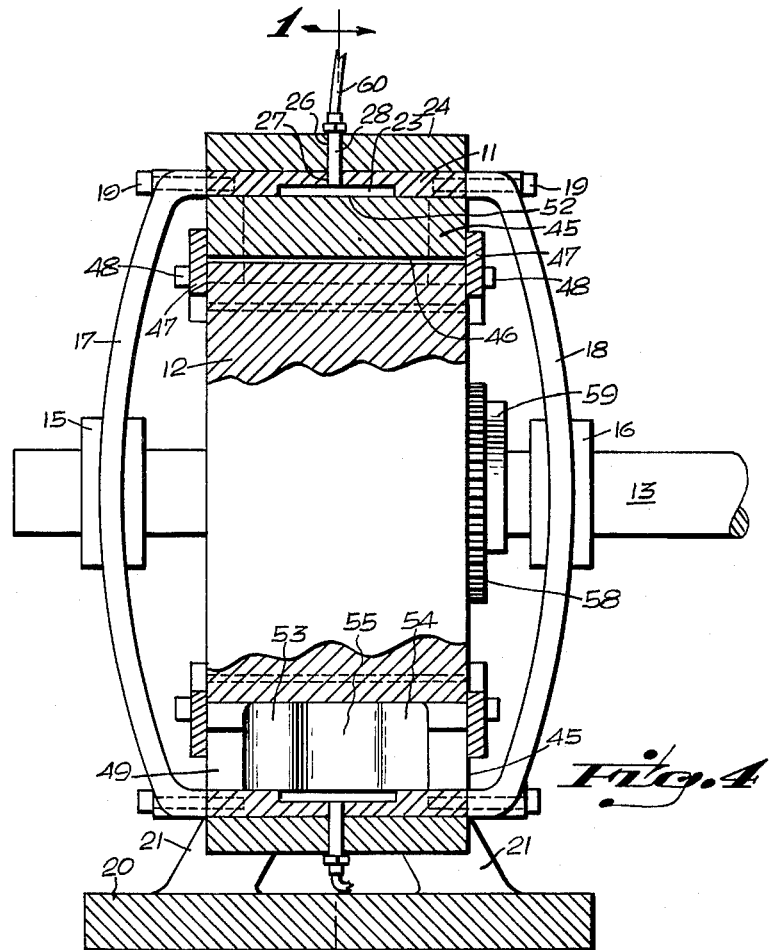
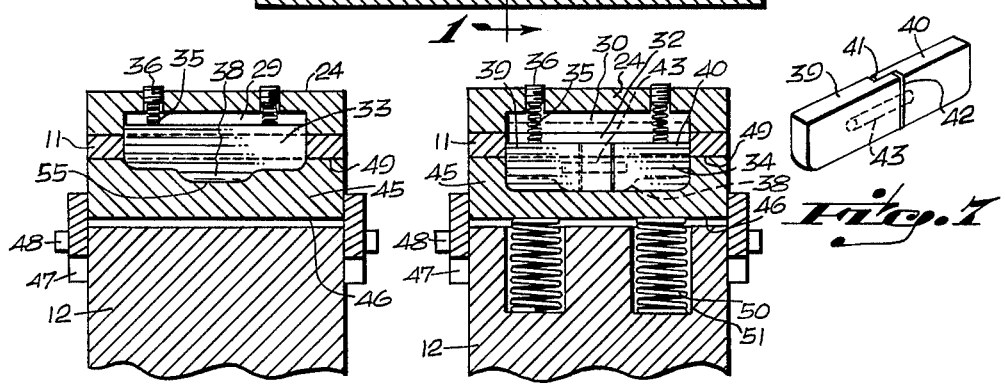
INVENTOR.
LEROY W. ROSS
BY E. H. Schmidt
ATTORNEY.

United States Patent Office 3,262,432
Patented July 26, 1966

3,262,432
ROTARY ENGINE
Leroy W. Ross, P.O. Box 96, Coconut Grove Station, Miami, Fla.
Filed Apr. 6, 1964, Ser. No. 357,373
1 Claim. (Cl. 123—14)

My invention relates to internal combustion engines and is directed particularly to improvements in rotary internal combustion engines.

Many attempts have been made in the past to devise a rotary engine to replace the reciprocating piston type of internal combustion engine commonly used in automotive vehicles, aircraft, and marine applications, to mention but a few of the major uses of such engines. The rotary engines heretofore proposed, however, despite their distinct theoretical advantages in efficiency, low weight-to-power ratio, and simplicity of structure and operation, have found little, if any, commercial acceptance, with the result that the reciprocating piston type of engine still remains overwhelmingly dominant in the field.

A principal reason why such rotary engines as have heretofore been proposed or devised have not been successful is their inability to effectively seal off the combustion chamebr at the rotary sliding juncture of the engine rotor and stator, whereby the high compression ratios in the explosion chamber necessary for high power output could not be achieved, and whereby "blow-by" at the juncture upon explosion further dissipated power once combustion occurred. Another reason for the failure of rotary engines heretofore proposed and devised is believed to be their intricacy, particularly their intricacy in valving at the combustion chamber, which not only necessitated machining to unusually close tolerances, but also resulted in rapid wear at critical zones so that engine life was very short as compared with standards set by the reciprocating piston type of internal combustion engine.

It is accordingly the principal object of my invention to provide an improved rotary internal combustion engine that obviates the above-mentioned deficiencies in prior rotary engines by novel piston and combustion chamber seal mechanism that radically reduces gas leakage in the compression and expansion phases, thereby, for the first time, achieving the efficiency of operation necessary in a commercially competitive engine.

A more particular object of the invention is to provide a rotary engine of the above nature wherein the piston members and moving sealing members are spring-mounted to minimize gas leakage at the meeting surfaces and at the same time, accommodate for wear and expansion at these important zones of contact.

Another object of the invention is to provide an improved rotary engine of the character described wherein sealing action at the combustion chamber is controlled directly by the arcuate movement of the piston in passing the combustion chamber, thereby eliminating any complexities in timing mechanism and its adjustment, and, at the same time, achieving the utmost in simplicity and economy of manufacture.

Still another object is to provide a novel rotary engine of the character above described which will be simple in structure, efficient in operation, well adapted to fuel injection techniques for utilization of the less expensive fuels, and long-wearing and trouble-free in use.

Other objects, features and advantages of the invention will be apparent from the following description when read with reference to the accompanying drawings. In the drawings, wherein like reference numerals denote corresponding parts throughout the several views:

FIG. 4 is a side elevational view of the engine with portions broken away and illustrating details of the pistons in their position as illustrated in FIG. 2;

FIG. 5 is a cross-sectional view taken along the line 5—5 of FIG. 2 and illustrating details of the leading moving sealing member mechanism;

FIG. 6 is a cross-sectional view taken along the line 6—6 of FIG. 3 and illustrating details of the lagging moving sealing member valve mechanism; and FIG. 7 illustrates, in perspective, constructional details of the lagging moving sealing member.

Figure 1:
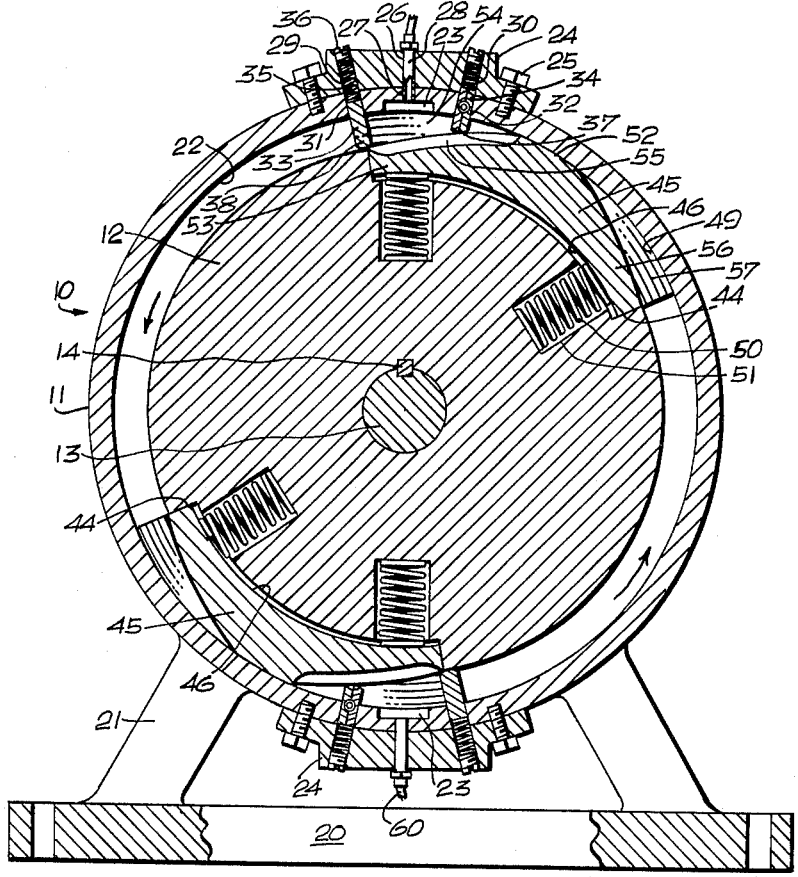
FIG. 1 is a transverse vertical cross-sectional view of a rotary engine embodying the invention, taken along the line 1—1 of FIG. 4 in the direction of the arrows, and illustrating the pistons thereof at their rotary position with respect to the compression chambers at the instant just prior to the sealing of the compression zones at the beginning of their compression phase.

Referring now in detail to the drawings, the numeral 10 in FIGS. 1 and 4 designates an improved rotary internal combustion engine embodying the invention, the same being comprised, generally, of an annular stator, generally designated by numeral 11, and a cylindrical rotor member 12 coaxially disposed within said stator and of a diameter somewhat less than the internal diameter of said annular stator. The rotor member 12 is fixed to an axial shaft 13 as by a key 14 (FIG. 1), which shaft is journalled in bearings 15 and 16 at each side of the engine supported in diagonal frame plates 17, 18, respectively, secured against the ends of the stator 11 as by bolts 19. The stator 11 is rigidly secured to a support base 20 as by four stanchions or legs 21 welded between said stator and said base.

The cylindrical internal surface 22 of the annular stator 11 is machined to a smooth finish for sealing against the radial rotor pistons in their circular travel about the rotational axis, as is hereinbelow more fully described. The internal surface 22 is also provided with a pair of diametrically-opposed compression zone recesses 23, which may be at the top and bottom of the stator, as illustrated in FIGS. 1 and 4. As further illustrated in FIG. 4, the compression zone recesses 23 are centrally disposed along the width of the stator 11 and are of a width somewhat less than the width of the stator.

A rectangular head member 24 is fixed, as by bolts 25, in face-to-face relation against the outside of the stator 11 at zones thereof opposite each of the compression zone recesses 23. The head members 24 each have a tapped central bore 26 in coaxial alignment with openings 27 communicating with one each of the compression zone recesses 23, within which bores are received fuel injection nozzles 28.

The insides of the head members 24 are each further formed, at each side of the bore 26, with rectangular slots 29, 30, which slots lie along planes coextensive with the axis of rotation of the rotor member 12 and approximately radially-extending with respect thereto. The slots 29, 30 communicate with similar slots 31, 32 in the annular stator 11 to provide guide means for leading and lagging rectangular moving sealing members 33, 34, respectively. The moving sealing members 33, 34, are each resiliently outwardly pressed in the direction of the peripheral surface of the cylindrical rotor member 12 as by a pair of helical compression springs 35 acting between the inner edges of said moving sealing members and spring adjustment and retainer screw studs 36 threaded in openings in the head member 24. As best illustrated in FIG.

2, the leading moving sealing members 33 are each rounded along their outer end, as indicated at 37, and formed therealong with a central, elongated protruding portion 38, for the purpose hereinbelow appearing. (See FIG. 5.) As illustrated in FIGS. 6 and 7, the lagging moving sealing members 34 are comprised of a pair of vertically-separated complementary sealing portions 39, 40, arranged for longitudinal axial relative sliding motion along face-to-face surfaces defined by complemental recesses 41, 42, machined at the facing ends of said sealing portions. A compression spring 43 disposed in interior axially-extending openings provided in the sealing portions 39, 40 of the lagging moving sealing member 34, serves to resiliently urge said sealing portions apart to snugly contact the end portions of the sealing structure in the pistons, as is hereinbelow more fully explained.

Figure 2:
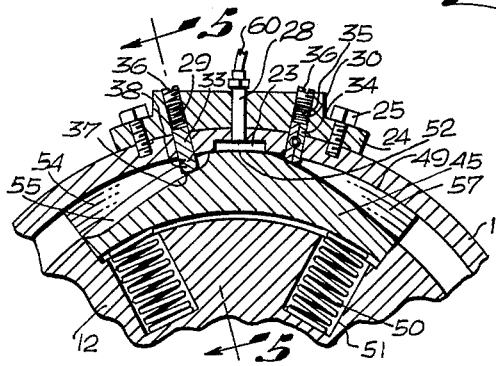
FIG. 2 is a cross-sectional view similar to a portion of FIG. 1, but showing a piston advanced to its position at the completion of the compression phase and just prior to ignition for the power phase.
Figure 3:
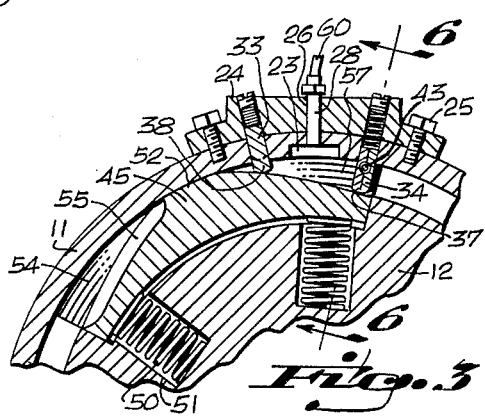
FIG. 3 is a cross-sectional view similar to FIG. 2, but showing the piston still further advanced to its position near the completion of the power or expansion phase.

The rotor member 12 is formed with a diametrically-opposed pair of segmental arcuate recesses 44 in its periphery, which recesses extend through to each side of said rotor. Received within each of the recesses 44 is a piston member 45, the inner surface 46 of which conforms to the arcuate shape of its recess 44 and the ends of which are in radially sliding contact with the end walls of said recesses. The sides of the piston members 45 are flush with the flat ends of the rotor member 12 and, as illustrated in FIGS. 4, 5, and 6, are constrained against sideward displacement by arcuate retainer members 47 received to said rotor member as by bolts 48. The arcuate shape of the outer surface portion 49 of the piston members 45 conforms to that of the interior cylindrical surface 22 of the annular stator 11, and said outer surface portion is resiliently held in face-to-face engagement therewith by means of a plurality of compression springs 50 seated in cylindrical recesses 51 in the rotor member 12 and bearing against the undersides of said piston members. The transverse central portion 52 of the outer surface portion 49 of each piston member 45 extends fully from side to side and has an arcuate length only slightly greater than the arcuate length of the compression zone recess 23, as is best illustrated in FIG. 2.

As illustrated in FIGS. 1, 2, 3, and 5, the forward or leading portion 53 of each of the piston members 45 is formed with a sliding sealing member receiving groove 54 of the same width as the leading sliding sealing members 33 and gradually increasing in depth from the front or leading edge of the tranverse central portion 52 of the piston member 45 to the forward end of said piston, where it terminates substantially flush with the peripheral surface of the rotor member 12. Preferably, the bottom surface of the valve gate receiving groove 54 decreases along a slightly convex path from end to end, to increase the area of abutment therewith of the inner rounded ends of the sliding sealing members 33 and 34. The bottom of the sliding sealing member receiving groove 53 is also formed along its length with a central depression 55, complemental in shape to the central protruding portion 38 of the leading sliding sealing member 33.

The rearward or lagging portion 56 of each of the piston members 45 is also formed along its length with a sliding sealing member receiving groove 57 of the same width as the leading sliding sealing members 33 and gradually increasing in depth from the back or trailing edge of the transverse central portion 52 of the piston member 45 to the rearward end of said piston, where it terminates substantially flush with the peripheral surface of the rotor member 12. The bottom surface of the sliding sealing member receiving groove 57 also preferably decreases along a slightly convex path from end to end to increase the area of abutment therewith of the inner rounded ends of the sliding sealing members 33 and 34.

As illustrated in FIG. 4, a starter gear 58 is secured to the rotor shaft 13 adjacent one side of the rotor 12 for engagement with the driving pinion of the usual electric starter motor (not illustrated). A fuel pump actuating cam 59 is also fitted on the rotor shaft 13 for operating a conventional fuel injection pump (not illustrated) in timed sequence with rotor rotation for supplying fuel under pressure through conduits 50 and injection nozzles 28 to the compression zone recesses 23.

Considering now the operation of the rotary engine and referring first to FIG. 1, it will be seen that as the rotor is rotated anti-clockwisely from the position illustrated, the leading sliding sealing members 33 will fall into their respective sliding sealing members receiving grooves 54, with the central protruding portions 38 of said leading sliding sealing members received on the central depressions 55 of said grooves. Thus the forward ends of the grooves 54 in the leading portions 53 of the piston members 45 are sealed off; and since the rearward ends of said grooves are also sealed off by the transverse central portions 52 of said piston members being in face-to-face sliding contact with the interior cylindrical surface 22 of the stator 11 under the resilient urging of the piston compression springs 50, the entrapped air will be compressed for the most part into the compression zone recesses 23 as the pistons thereafter move into the position illustrated in FIG. 2. In this connection, it is to be noted that since the lagging sliding sealing members 34 are not provided with central protruding portions fitting into the central depressions 55 of the grooves 54, air behind said lagging sliding sealing members can pass through said central depressions during the compression phase of operation.

As soon as the air is fully compressed into the compression zone recesses 23, fuel will be injected through the nozzles 28 and be ignited by the heat of compression as in ordinary diesel engine operation. As the rotor 12 continues to rotate thereafter, the hot gasses of ignition will be allowed to expand in the sliding sealing member receiving grooves 57 in the lagging end of the piston members 45, thereby doing work against said piston members by exerting a force in the direction of rotation. In this power or expansion phase of engine operation (see FIG. 3), it will be noted that the lagging sliding sealing members 34 seal off the rearward ends of the sliding sealing member receiving grooves 57, there being no central depression in said grooves. By the same token, the leading sliding sealing members 33, having central protruding portions 38, cannot seat in sealing engagement in the grooves 57, and therefore do not impede the expansion of gasses forward thereof (see FIGS. 3 and 6.) As the rotor continues to rotate, the turbulance of free air in the annular space between the rotor member 12 and the stator 11 and behind the open ends of the grooves 57 in the lagging portion 56 of the piston members 45, will quickly scavenge said grooves of spent gasses. Exhaust collector manifolds (not illustrated) can be fitted at each side of the stator for carrying away the exhaust gasses where required.

While there are shown two diametrically-opposed piston members and two diametrically-opposed combustion stations firing concurrently in the illustrative embodiment of the invention, it will be apparent that more or less pistons and firing stations could be used about the periphery of the engine, and that firing could take place simultaneously or consecutively, depending upon engine size and power requirements.

One of the salient features of the invention resides in the fact that the spring mounting of the piston members and sliding sealing members not only insures positive sealing action between the piston members and the interior cylindrical surface of the stator, and between the sliding sealing members and the grooves in the piston members, but also automatically accommodates for wear and expansion in these critical zones.

While I have illustrated and described herein only one form in which my invention can conveniently be embodied in practice, it is to be understood that this form is presented by way of example only and not in a limiting sense. This invention, in brief, includes all modifications and embodiments coming within the scope and spirit of the following claim.

What I claim as new and desire to secure by Letters Patent of the United States is:

In a rotary internal combustion engine, the combination comprising, a stator having a wall portion defining an internal cylindrical surface, a rotor member of lesser diameter than the diameter of said internal cylindrical surface and coaxially journalled therein for relative rotation within said stator, a recess in said internal cylindrical surface defining a compression zone, a piston member supported at the periphery of said rotor, means limiting said piston member to radial movement with respect to said rotor, said piston member having an arcuate outer surface portion in face-to-face contact with said internal cylindrical surface of said stator, means resiliently pressing said piston member outwardly against said internal cylindrical surface, said arcuate outer surface portion of said piston comprising a central transverse surface portion of such size as to periodically substantially seal off said compression zone recess during the rotation of said rotor, the arcuate surface of said piston member between said central transverse surface portion and the leading end thereof having a first groove of gradually increasing depth and terminating substantially flush with the peripheral surface of said rotor member, the arcuate surface of said piston member between said central transverse surface portion and the lagging end thereof having a second groove of gradually increasing depth and terminating substantially flush with the peripheral surface of said rotor, and resilient sealing means supported with respect to said stator and controlled by the surface contours of said leading and lagging grooves for sequentially, during the rotation of said rotor, compressing gas in said leading groove into said compression zone recess, sealing off said recess, and then expanding the compressed gas against the moving surface of said lagging piston groove, wherein said resilient sealing means comprises a first sliding sealing member resiliently supported with respect to said stator at a position forward of said recess, a second sliding sealing member resiliently supported with respect to said stator at a position rearward of said recess, said first sliding sealing member having a forward end portion operative to seat within and seal off said first groove, said second sliding sealing member having a forward end portion operative to seat within and seal off said second groove, wherein said first groove is formed with a central longitudinal depression and wherein said forward end position of said first sliding sealing member is formed with a central protruding portion complementary to said longitudinal depression.

References Cited by the Examiner
UNITED STATES PATENTS

| | | | |
|---|---|---|---|
| 542,920 | 7/1895 | Berry | 91—105 X |
| 594,924 | 12/1897 | Woodard | 91—105 |
| 1,427,053 | 8/1922 | Bidwell | 123—14 |
| 2,214,833 | 9/1940 | Hocker | 123—14 |
| 2,353,446 | 7/1944 | Davidson | 123—14 |
| 2,690,166 | 9/1954 | Shore | 123—14 |
| 3,137,280 | 6/1964 | Jacobson et al. | 123—14 |

FOREIGN PATENTS

| | | |
|---|---|---|
| 12,833 | 6/1906 | Great Britain. |
| 296,564 | 9/1928 | Great Britain. |

SAMUEL LEVINE, *Primary Examiner.*

A. S. ROSEN, *Assistant Examiner.*